US008756154B2

(12) United States Patent
Fitzpatrick

(10) Patent No.: US 8,756,154 B2
(45) Date of Patent: Jun. 17, 2014

(54) PRICE PAID DATABASE METHOD AND SYSTEM

(75) Inventor: James Michael Fitzpatrick, Newport Beach, CA (US)

(73) Assignee: Catalina Marketing Corporation, St. Petersburg, FL (US)

( * ) Notice: Subject to any disclaimer, the term of this patent is extended or adjusted under 35 U.S.C. 154(b) by 2835 days.

(21) Appl. No.: 09/730,592

(22) Filed: Dec. 7, 2000

(65) Prior Publication Data

US 2003/0088466 A1    May 8, 2003

(51) Int. Cl.
 *G06Q 40/00*        (2012.01)
(52) U.S. Cl.
 USPC .............................. 705/40; 705/7.29; 705/20
(58) Field of Classification Search
 USPC .............. 364/401; 705/20, 26, 10, 14, 21, 16, 705/400
 See application file for complete search history.

(56) References Cited

U.S. PATENT DOCUMENTS

| | | | |
|---|---|---|---|
| 4,855,908 A * | 8/1989 | Shimoda et al. | 705/20 |
| 4,972,504 A * | 11/1990 | Daniel et al. | 705/7.29 |
| 4,992,940 A | 2/1991 | Dworkin | |
| 5,349,648 A * | 9/1994 | Handley | 715/517 |
| 5,490,251 A | 2/1996 | Clark et al. | 709/237 |
| 5,857,175 A * | 1/1999 | Day et al. | 705/14.14 |
| 5,873,069 A * | 2/1999 | Reuhl et al. | 705/20 |
| 5,918,211 A * | 6/1999 | Sloane | 705/16 |
| 6,026,370 A | 2/2000 | Jermyn et al. | |
| 6,078,891 A * | 6/2000 | Riordan et al. | 705/7.34 |
| 6,292,786 B1 | 9/2001 | Deaton et al. | |
| 8,612,292 B1 * | 12/2013 | Brown et al. | 705/14.53 |
| 2002/0035549 A1 | 3/2002 | Hagio et al. | |

FOREIGN PATENT DOCUMENTS

| | | |
|---|---|---|
| JP | 10222574 | 8/1998 |
| JP | H11-221203 | 8/1999 |
| JP | 2000-048259 | 2/2000 |
| JP | 2000 300543 | 10/2000 |

OTHER PUBLICATIONS

M. Negin, et al., Computer (online), vol. 33, No. 2, pp. 2-7, "An Iris Biometric System for Public and Personal Use", Feb. 2000 (p. 5 will be filed later).
M. Negin, et al., Computer (online), vol. 33, No. 2, pp. 2-7, "An Iris Biometric System for Public and Personal Use", Feb. 2000.
Supplementary ESR EP 01995262, Feb. 17, 2005.
Annex to Supplementary ESR EP 01995262, Feb. 17, 2005.
M. Negin et al., Computer (online), vol. 33, No. 2, pp. 2-7, "An Iris Biometric System for Public and Personal Use", Feb. 2000.

(Continued)

*Primary Examiner* — Olabode Akintola
(74) *Attorney, Agent, or Firm* — Pillsbury Winthrop Shaw Pittman LLP

(57) ABSTRACT

A novel price paid database, method, system, and computer program product in which checkout items are scanned at a plurality of stores, and a checkout computer identifies the purchased items. The checkout computer determines a price paid for each purchased item. A central computer records in a price-paid database an item identification and price-paid for each purchased items. The central computer publishes the price-paid database. The checkout computer recurrently updates the price-paid database in the central computer with the price paid for each purchased item, the customer identification (if available), the store identification, and a list price for each purchased item.

40 Claims, 6 Drawing Sheets

(56) References Cited

OTHER PUBLICATIONS

Airaffair.com (online), 2 pages, "The Air Affair Fuel Price Database", Jun. 14, 2000.
Trak Systems (online), 10 pages, "Trak Systems Recordtrak Software Information", 2000.
PCT Written Opinion PCT/US01/44703.
English Translation of Office Action in JP Application 2002-548530.
Annex to Supp. ESR EP 01995262, Feb. 17, 2005.
Apr. 3, 2003, PCT Written Opinion for PCT/US01/44703.
Dec. 5, 2002, PCT Search Report for PCT/US01/44703.

* cited by examiner

| Retailer | Product | Price Paid | List Price |
|---|---|---|---|
| Safeway | Sealtest milk ½ gallon | 1.29 | 1.29 |
| Safeway | Richland eggs, 1 dozen | 0.99 | 1.09 |
| Giant | Shenandoah, milk ½ gallon | 1.04 | 1.25 |
| Giant | Giant, eggs, 1 dozen | 1.39 | 1.39 |
| Foodlion | Lucerne, eggnog ½ gallon | 2.59 | 3.25 |
| Foodlion | Foodlion, eggs, 1 dozen | 1.20 | 1.20 |

Figure 2

| Retailer | Product | Price Paid | List Price | Customer | Time of Purchase | Card Discount |
|---|---|---|---|---|---|---|
| Safeway | Sealtest milk ½ gallon | 1.29 | 1.29 | 12Y1104 | 0404002010 | 0.20 |
| Safeway | Richland eggs, 1 dozen | 0.99 | 1.09 | 12Y1104 | 0404002010 | 0.12 |
| Giant | Shenandoah, milk ½ gallon | 1.04 | 1.25 | 12Z3223 | 0528001010 | 0.25 |
| Giant | Giant, eggs, 1 dozen | 1.39 | 1.39 | 12Z3223 | 0528001010 | 0.19 |
| Foodlion | Lucerne, eggnog ½ gallon | 2.59 | 3.25 | 12Y2884 | 1210990134 | 0.16 |
| Foodlion | Foodlion, eggs, 1 dozen | 1.20 | 1.20 | 12Y2884 | 1210990134 | 0.05 |

Figure 3

PRICE PAID DATABASE METHOD AND SYSTEM

BACKGROUND OF THE INVENTION

1. Field of the Invention

This invention relates to a database, method, and system whereby accurate prices paid for products in stores are captured even at a frequent shopper card level and archived for consumer access and market analysis.

2. Discussion of the Background

Consumer purchases these days are becoming increasingly more competitive. To entice consumers to buy a particular product, many retailers and discounters are using a frequent shopper card which, when presented at the time of purchase, substantially reduces the price of the item from that available to members of the public who have no frequent shopper card. These price discounts can vary as merchants use discounts to entice sales in items which will soon expire, be superceded by other items, or in which the distributors or manufacturers have themselves added promotional incentives. While such discount incentives are apparently mutually beneficial to the seller and buyer, knowledge of the actual price paid is critical in determining price margins and the price-acceptance by a customer.

Thus, data reflecting not the inventory list price nor the advertised sales price but rather the actual price paid is needed from across many sources to enable reliable statistical determinations to be valid.

Obtaining this data presents several problems. First, while there are syndicated sources which list prices of individual items, such as for example the manufacturer's suggested retail list price, data indicating the actual price of a product is only readily available at a local level such as the store or retail shop where the item is purchased. Further, consider the problem of relying on inventory price lists. Frequently, prices are negotiated between a seller and a buyer. While this is frequently associated with the purchase of expensive items, such as for example automobiles, price negotiations occur frequently during the purchase of not so expensive items. Price negotiations are also frequently made at a retailer during clearance, inventory reduction, and close out conditions. In these circumstances, the prices are quite elastic, as merchants are driven by other considerations besides prices on the individual items. For example, a merchant needing to clear old inventory to make sales space for new product will reduce prices to clear the old products. Merchants have discretion in setting prices. The economic restraint for the merchant is to pay the distributor or, in some cases, the manufacturer a contracted price. Even with the responsibility to pay the constructed price, it may be advantageous for the merchant to discount below wholesale and loose money on some products, if the discounted price enables the promotion of more profitable goods in the store.

Consider also situations where retailers do on-floor promotions to attract customers into a store. Here, again data showing price acceptance is potentially available, but only through capture of the actual prices paid for the purchased items.

Yet, capturing of data in these situations of extraordinary price elasticity in which marketing data is perhaps the most decisive in determining price acceptance by the customer is not provided for in syndicated sources. Further, the syndicated sources do not capture discounts from frequent shopping card programs.

As a consequence, data bases formed from syndicated price lists reflect average prices which have been set by historical supply and demand factors. Such databases do not necessarily reflect the reality of the sells market today, unless the market is unchanged from when the price lists were created.

Thus, the prices paid for purchased items are nowhere captured in an aggregated, pseudo-real-time database which monitors the price paid and records price history and price paid variations.

SUMMARY OF THE INVENTION

Accordingly, one object of the invention is to provide a pseudo-real-time database to capture actual prices paid for individual items across an aggregate number of stores.

Another object of the present invention is to update recurrently a price-paid database with information on customer purchases such as for example product identification, an actual price-paid, a customer identification, a store identification, a list sells price, and the price differential between the list sales price and the price paid. In one embodiment, customer identification is obtained from scanning a frequent shopper card, a credit card, a club member card, a debit card, a fingerprint, retinal scan, or a signature.

Still a further object of the present invention is to publish the price-paid database in a format in which users can access.

Another object of the present invention is to provide the user with a user-defined (i.e. user-specified) district in which to obtain information on the prices paid. In one embodiment, the user selects parts of the price paid database (within a specified district) to display the prices paid by store selection, by customer selection, by brand selection, or by sales category, such as for example paint, tires, lumber, food, clothes, computers, etc.

Accordingly, these and other objects are provided for in a novel price paid database, method, system, and computer program product in which checkout items are scanned at a plurality of stores, and a checkout computer identifies the purchased items. The checkout computer determines a price paid for each purchased item. A central computer records in a price-paid database an item identification and price-paid for each purchased items. The central computer publishes the price-paid database. The checkout computer recurrently updates the price-paid database in the central computer with the price paid for each purchased item, the customer identification (if available), the store identification, and a list price for each purchased item.

The price paid method is included on a computer program product which stores data to implement the price paid process on the computer such as a general purpose computer or a network of general purpose computers.

Thus, the present invention provides users such as market analysts, manufacturers, and retailers with near real time information on the price acceptance of individual items in a local, district, state, regional, or national basis.

BRIEF DESCRIPTION OF THE DRAWINGS

A more complete description of the present invention and many of the attendant advantages thereof will be readily obtained as the same becomes better understood by reference to the following detailed description when considered in connection with the accompanying drawings, wherein:

FIG. 2 is an illustrative table showing a price-paid data base according to the present invention;

FIG. 3 is another illustrative table showing a price-paid data base according to the present invention;

DESCRIPTION OF THE PREFERRED EMBODIMENTS

Figure 1:
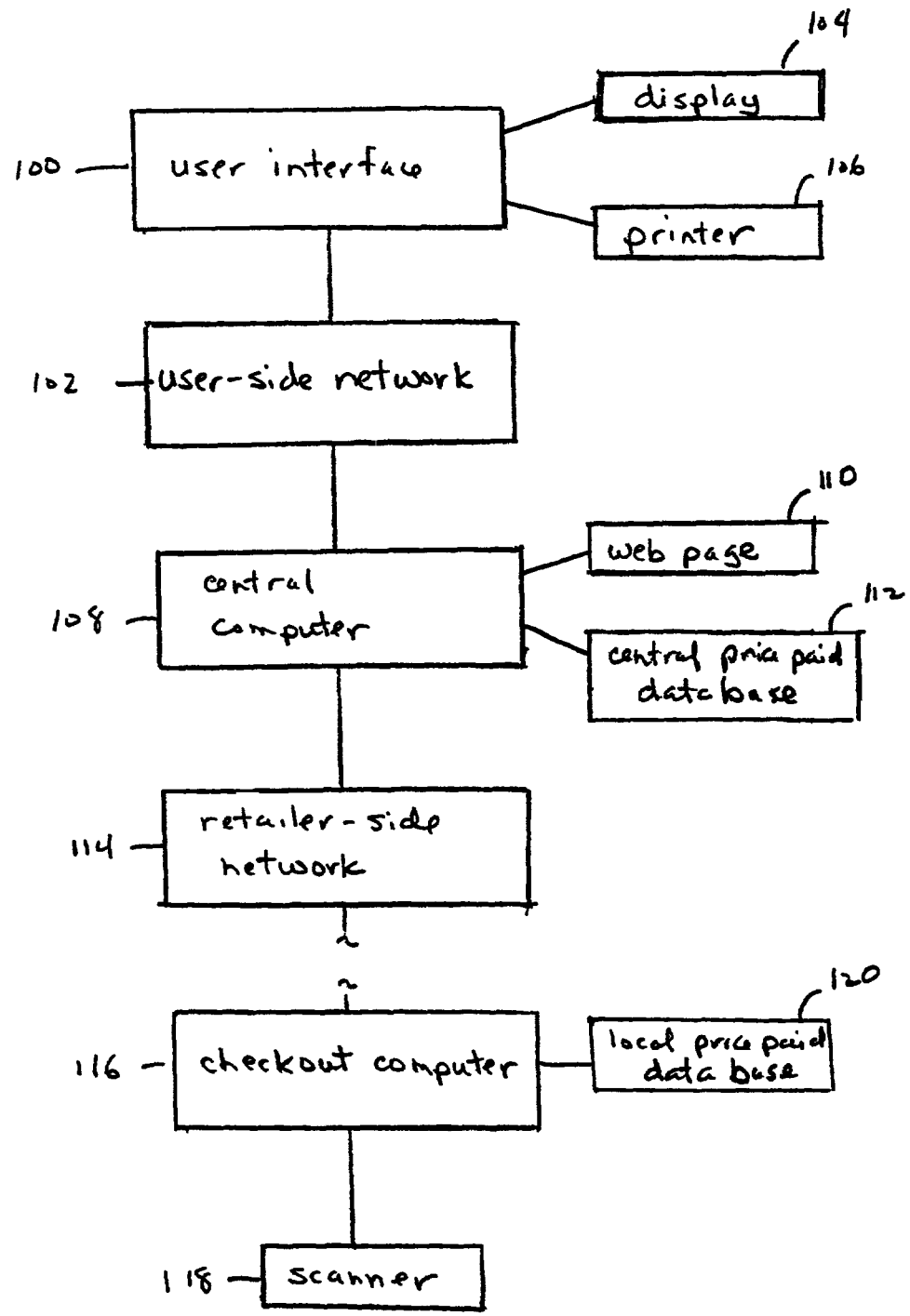
FIG. 1 is a block diagram showing implementation of the present invent invention on a computer system.

Referring now to the drawings, wherein like reference numerals designate identical or corresponding parts throughout the several views, and more particularly to FIG. 1 thereof, FIG. 1 is a block diagram showing the price-paid database system.

A user interface 100 is provided. The user interface can be a personal computer or other devices such as telephones for accessing a user-side network 102. The user-side network 102 is any suitable hardware and software for communicating to the user interface 100 including, for example, the communications controller 724 and the network 728 shown in the computer system 702 of FIG. 7, or any suitable Internet connection.

The user interface 100 has a display 104 and can be connected to a printer 106 which enables items in the price-paid database to be printed. The user side network 102 is connected to a central computer 108. The central computer 108 is any suitable personal computer, workstation, server, or other device, such as the computer system 702 of FIG. 7. The central computer 108 communicates to the user interface 100 using any suitable protocol and may be implemented using the computer system 702 of FIG. 7 for example. The central computer 108 includes a web page 110 or other electronic page for communicating with the user and a central price-paid database 112.

The central computer 108 is further connected to a retailer-side network 114 which networks the central computer 108 to retail stores participating in the price-paid database system of the present invention. The retailer-side network 114 is any suitable hardware and software for communicating to the checkout computer 116 including, for example, the communications controller 724 and the network 728 shown in the computer system 702 of FIG. 7, or any suitable Internet connection.

Each retail store in the retailer-side network has a checkout computer 116. The checkout computer 116 is any suitable personal computer, workstation, server, or other device, such as the computer system 702 of FIG. 7.

At the retail stores, the prices paid for individual items are captured, and the prices paid uploaded from the checkout computer 116 to the central computer 108 and stored in the price-paid database 112. The checkout computer 116 and a scanner 118 identify and capture the prices paid for purchased items. The scanner 118 may be implemented as any conventional scanning device for reading product information such as an item code (e.g., UDC, EAN, or JAN) from bar codes or other indicia on the product. Information read by the scanner 118 is transmitted to the checkout computer 116. The checkout computer 116 includes a local price paid database 120 which contains a similar structure to the central price paid database 112, but the local price paid database 120 only records price paid information associated with that particular retailer. The broken connection in FIG. 1 between the retailer side network 114 and the checkout computer 116 indicates that there are multiple checkout computers and that the price paid database system of the present invention is available to new retailers.

In one embodiment of the present invention, the checkout computer 116 stores a list of purchased items and recurrently uploads the list to the central computer 108 over the retailer-side network 114. Software for implementing the present invention can reside anywhere on the network, but preferably resides in the central computer 108.

In general, it can be seen that a price-paid database system of the present invention includes a user interface device 100 which logs a user onto the web page 110, permitting the user to interrogate the central price-paid data-base 112. The user interface device 100 includes an input device (not shown) such as a keyboard or a mouse which receives input from the user, a display device 104 which displays information to the user and a printer 106 which prints selected items from the central price-paid database 112. The user-side network 102 and the retailer-side network 114 can be the same computer network simultaneously functioning as both the user-side and the retailer-side network. The central computer 108 accesses storage devices (not explicitly shown in FIG. 1) to store the web page database 110 and the central price-paid database 112. The checkout computer 116 is interfaced to the scanner 118. The price-paid database system identifies purchased items and captures the price paid for each item. Through the retailer-side network, information about items purchased is returned to the central computer 108 recurrently to update the price-paid database.

The present invention stores information relating to a customer's shopping history as well as availability and prices of individual products. This information is stored in one or more memories such as a hard disk, optical disk, magneto-optical disk, and/or RAM, for example. One or more databases, such as the central price-paid database 112, may store the information used to implement the present invention. The databases are organized using data structures (e.g., records, tables, arrays, fields, graphs, trees, and/or lists) contained in one or more memories, such as the memories listed above or any of the storage devices listed below in the discussion of FIG. 7, for example.

FIG. 2 depicts a price paid table 201 for implementing a system for providing products, prices and availability in accordance with an embodiment of the present invention. The price paid table 201 is a data structure depicted in a relational format, whereby information stored in one column (i.e., field) of the table 201 is mapped or linked to information stored in the same row (i.e., record) across the other column(s) of the table 201. These data structures are used by the central computer 108 and/or other network or local computers to provide competitive pricing and availability between the various retailers. The price paid table 201 forms a portion of the central price-paid database 112, which is stored in any suitable storage device(s) or medium(s), such as the memory of the central computer 108 and/or any other suitable storage device(s) or medium(s).

The price-paid table 201 includes a field 203 for storing retailer identification, a field 205 for storing product descriptions of the products in the field 203, a field 207 for storing the prices paid for the products, and a field 209 for storing list prices of the products. The central computer 108 selects from the central price paid database 112 only those retailers within a specified shopping district and enters those retailers along with the actual prices and availability status into the price-paid table 201. The user can then determine from the price-paid table 201 the actual prices paid for the purchased products.

Other fields, as shown in FIG. 3, which are included in the price paid database include customer identification, time of purchase, shopping card member discount. The price-paid table 301 includes a field 303 for storing retailer identification, a field 305 for storing product descriptions of the products in the field 303, a field 307 for storing the prices paid for the products, a field 309 for storing list prices of the products, a field 311 for storing the customer identification, a field 313 for storing the time of purchase, and a field 315 for storing the shopping card discount. The central computer 108 selects from the central price paid database 112 only those purchases within a specified shopping district. The user can then determine from the price-paid table 301 the prices paid and customer information regarding purchases in the specified shopping district.

Records in the price-paid database contain fields together with a set of operations for searching, sorting, recombining, and other database functions. One or more of U.S. Pat. Nos. 5,832,457; 5,649,114; 5,430,644; and 5,592,560 describe techniques for collecting consumer purchase history information and for storing such information in databases such as the central price-paid database 112, for example. U.S. Pat. Nos. 5,832,457; 5,649,114; 5,430,644; and 5,592,560 are incorporated herein by reference. Additionally, techniques for collecting consumer purchase information and for storing such information in databases, such as the central price-paid database 112, are described in other patents owned by Catalina Marketing and/or Catalina Marketing International. Each patent owned by Catalina Marketing and/or Catalina Marketing International is incorporated herein by reference.

Figure 4:
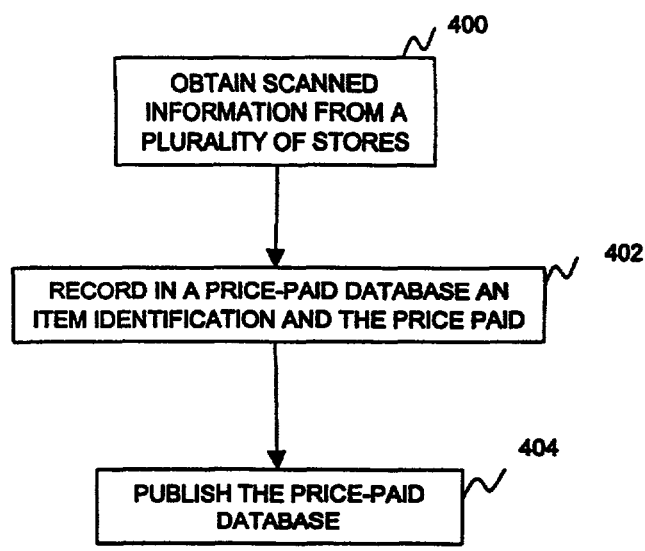
FIG. 4 is a flowchart showing the price paid method of the present invention.

FIG. 4 is a flowchart showing the price paid method of the present invention. In step 400, the central computer 108 obtains scanned information from a plurality of stores. Details of obtaining the scanned information are described below. At step 402, the central computer 108 records an actual price-paid and an item identification of the purchased items. The central computer obtains this information via the retailer-side network 114 and the checkout computer 116. The checkout computer 116, by identifying the purchased item via the scanner 118, assigns price discounts to the item if the purchaser belongs to a shopping club. The checkout computer 116 recognizes the purchaser, by way of a frequent shopper card or other readable media such as for example a credit card, a club member card, a debit card, a fingerprint image, a retinal image, or a signature. The frequent shopper card information is recorded in the checkout computer 116 along with the price-paid for each purchased item. The checkout computer 116 records the actual price paid as well as a flag indicating that these purchases were discounted by a frequent shopper card discount program. In step 402, the central computer 108 in communication with the checkout computer 116 records the actual price paid of the purchased item in the central price-paid database 112. Retrieving data from the local price paid databases 120 into the central price paid database 112 occurs recurrently subsequent to any purchases at the store and occurs even during periods of sales inactivity. The recorded information includes for example the price paid, list price, and customer identification (if available). The central computer aggregates in the central price-paid database 112 the prices-paid for items from multiple stores. At step 404, the central computer 108 publishes the aggregated price-paid database.

In one embodiment of the present invention, the central computer 116 publishes the central price-paid database 112 through the web-page 110 which can be customer-selected to specify a particular district, sales category, product (e.g., CRESTS toothpaste in an 8 ounce container) or customer category (e.g., all customers within the state of Florida). Other publishing methods, such as for example the publication of indexed volumes of the price paid database, are generated according to the present invention by the central computer 108. The indexed volumes are available through a subscription which provides subscribers with current volumes of the price-paid database. In general, the publishing methods of the present invention disseminate information in the price-paid database to users in an electronic, magnetic, or paper format.

Figure 5:
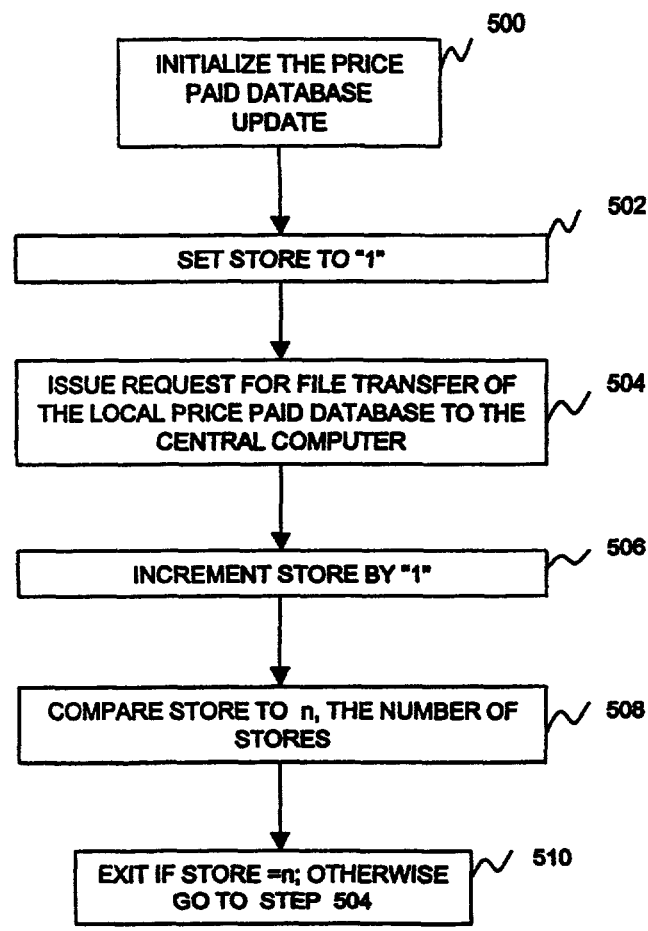
FIG. 5 is a flowchart showing a method according to the present invention to update the price paid database.

One way in which data in the central price paid database 112 is updated is by command from the central computer 108 which initiates updating on a recurrent basis to insure that data communication along the retailer-side network from the checkout computer 116 is not lost. FIG. 5 is a flowchart showing the steps by which the central computer 108 obtains the price paid information. At step 500, the central computer 108 initializes the price paid data base update routine and sets, in step 502, the STORE variable to "1". At step 504, the central computer requests transfer of data files from a checkout computer at the first retailer and retrieves the price paid data information. At step 506, the central computer increments the STORE variable by 1. At step 508, the central computer compares the value of the STORE variable to see if it is equal to the number n of retail stores connected through the retailer-side network 114. If STORE is not equal to n, the central computer proceeds back to step 504 and retrieves data from a checkout computer at the next retail store. If STORE is equal to n, the central computer exits, at step 510, the price-paid database update routine.

Figure 6:
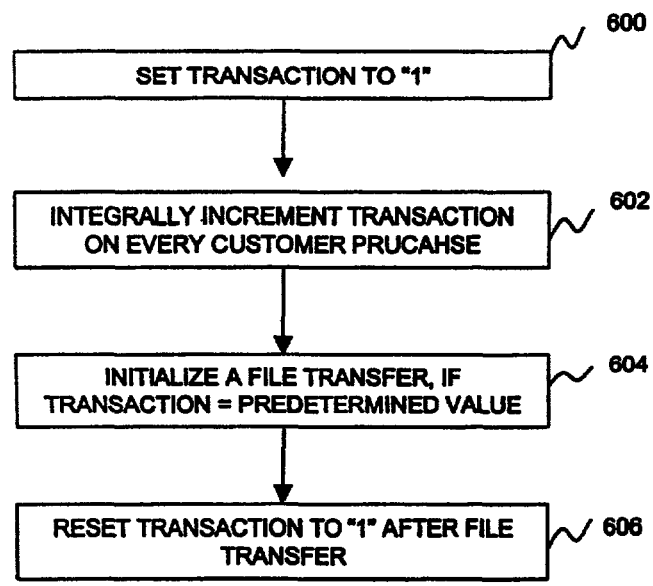
FIG. 6 is a flowchart showing a method according to the present invention to update the price paid database.

Another way in which data in the central price paid database is updated is by receiving updates from a network of checkout computers 116. FIG. 6 is a flowchart showing the steps by which the central computer 108 receives information from the local price paid databases 120. At step 600, the checkout computer 116 sets a TRANSACTION variable to "1". The checkout computer 116 increments, in step 602, the value of the TRANSACTION variable by 1 every time a customer purchases goods from the retailer. After a predetermined number N of times, such as for example corresponding the average number of transitions in 4 hrs of business, the checkout computer 116 in step 604 initializes a file transfer of the local price paid data base 120 to the central computer 108. The file transfer can occur using a number of standard communication protocols such file transfer protocol (FTP). Once the file transfer is complete, the TRANSACTION variable is reset to 1, and the process returns to step 602.

The aforesaid methods and devices for the price paid database are contained in according to this invention on a computer program product. The computer program product is a storage medium including instructions which can be used to program a computer or a plurality of network computers to perform a process of the invention. Storage medium can include, but is not limited to, any type of disc including floppy disc, optical disc, CD ROMs, and magneto optical disc, ROMs, RAMs, EPROMs, EEPROMs, magnetic or optical cards, or any type of medium suitable for storing electronic instructions.

This invention can be conveniently implemented easily in a general purpose digital computer or a network of general purpose digital computers and/or microprocessors programmed to record the teachings of the present invention, as will be apparent to those skilled in the computer art from reading the above descriptions regarding the figures. Appropriate software coding can readily be programmed by skilled programmers based on the teaching of the present disclosure, as will be apparent to those skilled in the software art. The invention may also be implemented by preparation of applications specific integrated circuits or by interconnecting an appropriate network of conventional component of circuits, as will be readily apparent to those skilled in the art.

It is to be understood that the system in FIG. 1 is for exemplary purposes only, as many variations of the specific hardware and software used to implement the present invention will be readily apparent to one having ordinary skill in the art. For example, the functionality of the checkout computer 116 and the scanner 118 may be combined in a single device. These implementations and other implementations of computer systems are described in greater detail in one or more of U.S. Pat. Nos. 4,723,212; 4,910,672; 5,173,851; 5,612,868; and 6,026,370, each of which is incorporated herein by reference. To implement these variations as well as other variations, a single computer (e.g., the control computer of FIG. 1) may be programmed to perform the special purpose functions of two or more of any of the devices shown in FIG. 1. On the other hand, two or more programmed computers may be substituted for any one of the devices shown in FIG. 1. Principles and advantages of distributed processing, such as redundancy and replication, may also be implemented as desired to increase the robustness and performance of the system, for example.

Figure 7:
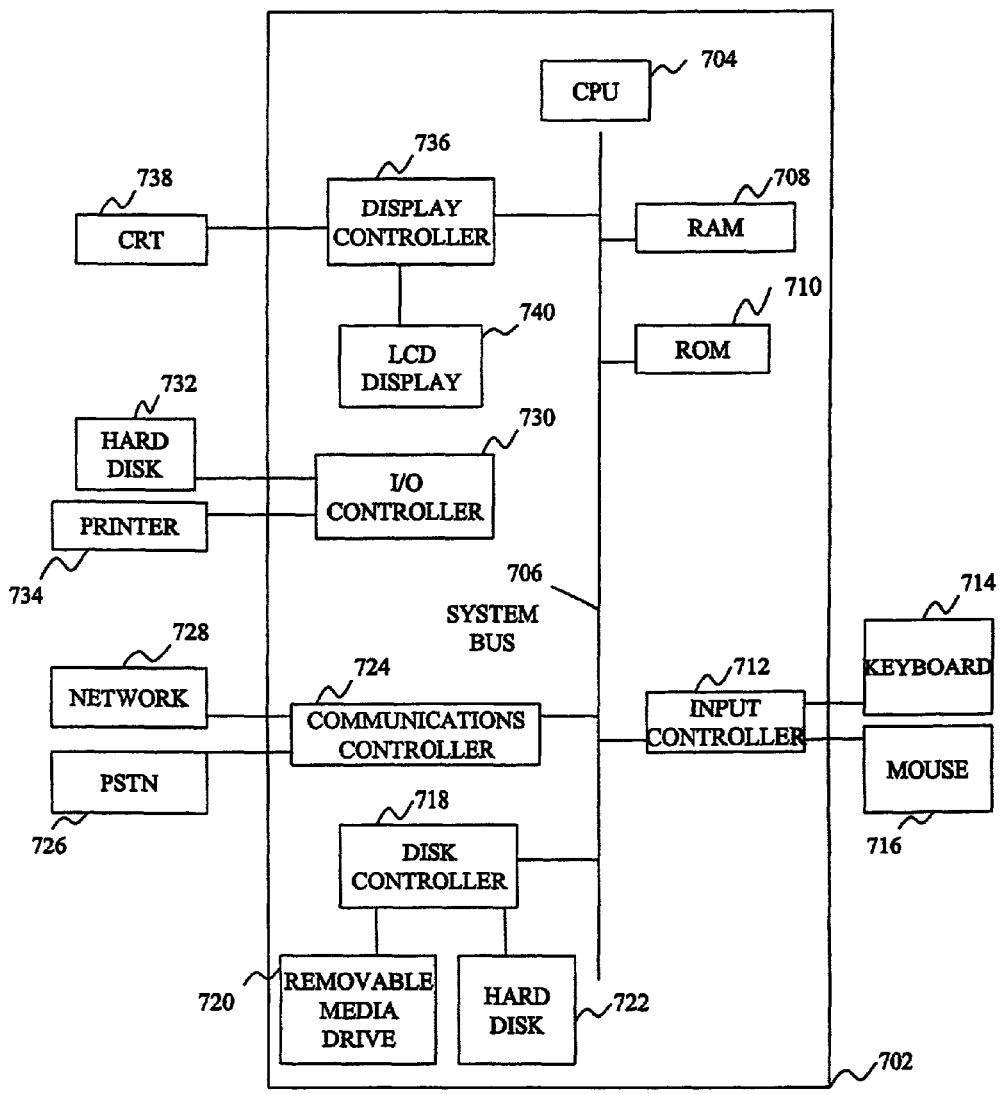
FIG. 7 is a schematic illustration of a computer system programmed to perform one or more of the special purpose functions of the present invention.

FIG. 7 is a block diagram of an exemplary computer 702 that may be programmed to perform one or more of the special purpose functions of the present invention. The computer 702 is a personal computer, a portable computer, a computer workstation with sufficient memory and processing capability, or any device configured to work like a computer. In one embodiment, the computer device 702 is a device diagrammatically shown in FIG. 7. In this embodiment, the computer 702 includes a central processing unit 704 (CPU) that communicates with a number of other devices by way of a system bus 706. The computer 702 includes a random access memory (RAM) 708 that stores temporary values used in implementing the print job.

The central processing unit 704 is configured for high volume data transmission for performing a significant number of mathematical calculations in processing the print jobs. A Pentium III microprocessor such as the 1 GHz Pentium III manufactured by Intel Inc. may be used for CPU 704. The processor employs a 32-bit architecture. Other suitable processors include the Motorola 500 MHZ Power PC G4 processor and the Advanced Micro Devices 1 GHz AMD Athlon processor. Multiple processors and workstations may be used as well.

The ROM 710 is preferably included in a semiconductor form although other read only memory forms including optical medium may be used to host application software and temporary results. The ROM 710 connects to the system bus 706 for use by the CPU 704. The ROM 710 includes computer readable instructions that, when executed by the CPU 704, perform different functions associated with printing and managing print jobs. An input control 712 connects to the system bus 706 and provides an interface with various peripheral equipment including a keyboard 714 and a pointing device such as a mouse 716 settles to permit user interaction with graphical user interfaces. The input controller 712 may include different ports such as a mouse port in the form of a PS2 port or, for example, a universal serial bus (USB) port. The keyboard port for the input controller 712 is in the form of a mini-DIN port although other connectors may be used as well. The input controller 712 may also include serial ports or parallel ports as well.

A disc controller 718 is in the form of an IDE controller and connects via driving cables to a removal media drive 720 which may be implemented as a floppy disc drive, as well as a hard disc drive 722 and a CD-ROM drive (not shown). In addition, a PCI expansion slide is provided on a disc controller 718, a motherboard that hosts the CPU 704. An enhanced graphic port expansion slot is provided and provides 3-D graphics with fast access to the main memory. The hard disc 722 may also include a CD drive that may be readable as well as writable. A communication controller 724 provides a connection to a network L1. The network L1 may be a connection to the public switched telephone network (PSTN) 726 for providing Internet access, or to a network 728 such as a local area network, wide area network, a virtual private network (VPN), or an extranet. In one embodiment, the network L1 and the connection to the communication controller 724 are made by way of a plurality of connections including a cable-modem connection, digital subscriber line (DSL) connection, fiber optic connection, dial-up modem connection, and the like that connects to the communication controller 724.

An input/output controller 730 also provides connections to the external components such as an external hard disc drive 732, a printer 734, for example, by way of an RS 232 port and a CSI bus.

A display controller 736 interconnects the system bus 706 to a display device, such as a cathode ray tube (CRT) 738. While a CRT is shown, a variety of display devices may be used such as an LCD (liquid crystal display) 740, or plasma display device. Display device permits displaying of graphical user interfaces.

Numerous modifications and variations of the present invention are possible in light of the above teachings. It is therefore to be understood that within the scope of the appended claims, the invention may be practiced otherwise than as specifically described herein.

The invention claimed is:

1. A computer-implemented method of providing prices paid for purchased items based on a user location that is associated with a user, the method being implemented on a computer having one or more physical processors programmed by computer program instructions that when executed perform the method, the method comprising:

storing, by the computer, in a price-paid database, a plurality of item identifications, wherein each item identification identifies an item that was purchased and is stored in association with a price paid for the item and a retail location at which the item was purchased;

receiving, by the computer, a request from a user to access information from the price-paid database;

obtaining, by the computer, a user location that is associated with the user;

identifying, by the computer, at least one retail location from the price-paid database based on the user location;

obtaining, by the computer, one or more prices paid for one or more items at the one or more retail locations responsive to the request; and providing, by the computer, the one or more prices paid for the one or more items from the price-paid database responsive to the request.

2. The method of claim 1, further comprising:

receiving a customer identification associated with a first item identification from among the plurality of item identifications; and storing the customer identification in the price-paid database in association with the first item identification.

3. The method of claim 2, wherein receiving the customer identification comprises:

receiving the customer identification based on a scan of a frequent shopper card, a credit card, a club member card, or a debit card.

4. The method of claim 2, wherein receiving the customer identification comprises:
receiving the customer identification based on a scan of a fingerprint, a retina, or a signature.

5. The method of claim 1, the method further comprising:
recurrently receiving a new set of item identifications and a corresponding price paid associated with each of the new set of item identifications.

6. The method of claim 1, the method further comprising:
receiving an inventory list price associated with a first item identification from among the plurality of item identifications or a price differential between the inventory list price and a first price paid associated with the first item identification; and
storing the inventory list price or the price differential in the price-paid database.

7. The method of claim 6, wherein the method further comprising:
receiving a customer identification that identifies a customer that purchased a first item identified by the first item identification and a store identification that identifies the at least one retail location where the first item was purchased; and
storing the customer identification and the store identification in association with the first item identification in the price-paid database.

8. The method of claim 7, the method further comprising:
formatting the price-paid database into one or more columnar entries that store the customer identification, the store identification, the first item identification, the first price paid, the inventory list price, or the price differential.

9. The method of claim 1, wherein providing the one or more prices paid comprises:
generating a web page that displays the one or more prices paid.

10. The method of claim 9, the method further comprising:
receiving, in association with the web page, a selection of a district, a store, a customer, a brand, or a sales category, wherein the one or more prices paid is provided based on the selected district, store, customer, brand, or sales category.

11. The method of claim 1, wherein obtaining the user location comprises:
determining a zip code or an area code related to the user; and
determining an area of a district for which to provide the one or more prices paid based on the zip code or the area code.

12. The method of claim 1, wherein obtaining the user location comprises:
determining a remote district, a regional district, or a national district related to the user; and
determining an area of a district for which to provide the one or more prices paid based on the remote district, the regional district, or the national district.

13. The method of claim 9, the method further comprising:
receiving, in association with the web page, a selection of a district for which to provide the one or more prices paid, wherein the one or more prices paid is provided based on the selection.

14. The method of claim 1, the method further comprising:
recurrently requesting transfer of a new set of item identifications from one or more retailers.

15. The method of claim 1, further comprising:
requesting transfer of an inventory list price for at least a first item identification from among the plurality of item identifications or a price differential between the inventory list price and a first price paid associated with the first item identification.

16. The method of claim 15, further comprising:
requesting transfer of a customer identification of a customer that purchased a first item identified by the first item identification or a store identification of a store at which the first item was purchased.

17. The method of claim 16, further comprising:
formatting the price-paid database into one or more columnar entries that store the customer identification, the store identification, the first item identification, the first price paid, the list price, and the price differential.

18. The method of claim 17, wherein providing one or more prices paid comprises:
generating a web page that displays the one or more prices paid.

19. The method of claim 18, further comprising:
receiving, in association with the web page, a selection of a district, a store, a customer, a brand, or a sales category; and
providing the one or more prices paid via the web page based on the selection.

20. The method of claim 18, wherein obtaining the user location comprises:
determining a zip code or an area code related to the user; and
determining an area of a district for which to provide the one or more prices paid based on the zip code or the area code.

21. The method of claim 18, wherein further comprising:
determining a remote district, a regional district, or a national district related to the user; and
determining an area of a district for which to provide the one or more prices paid based on the remote district, the regional district, or the national district.

22. The method of claim 18, further comprising:
receiving, in association with the web page, a selection of a district, wherein the one or more prices paid is provided based on the selected district.

23. A system of providing prices paid for purchased items, the system of providing prices paid for purchased items based on a user location that is associated with a user, the system comprising:
a price-paid database; and
a computer having one or more physical processors programmed by computer program instructions to:
store in the price-paid database a plurality of item identifications, wherein each item identification identifies an item that was purchased and is stored in association with a price-paid for the item and a retail location at which the item was purchased;
receive a request from a user to access information from the price-paid database;
obtain a user location that is associated with the user;
identify at least one retail location from the price-paid database based on the user location;
obtain one or more prices paid for one or more items at the one or more retail locations responsive to the request; and
provide the one or more prices paid for the one or more items from the price-paid database responsive to the request.

24. The system of claim 23, wherein the computer is further programmed to:
   receive a customer identification associated with a first item identification from among the plurality of item identifications; and
   store the customer identification in the price-paid database in association with the first item identification.

25. The system of claim 24, wherein the customer identification is scanned from a frequent shopper card, a credit card, a club member card, or a debit card.

26. The system of claim 24, wherein the customer identification is scanned from a fingerprint, a retina, or a signature.

27. The system of claim 23, wherein the computer is further programmed to:
   recurrently receive a new set of item identifications and a corresponding price paid associated with each of the new set of identifications.

28. The system of claim 27, wherein the computer is further programmed to:
   receive an inventory list price associated with a first item identification from among the plurality of item identifications or a price differential between the inventory list price and a first price paid associated with the first item identification; and
   store the inventory list price or the price differential in the price-paid database.

29. The system of claim 28, wherein the computer is further programmed to:
   receive a customer identification that identifies a customer that purchased a first item identified by the first item identification and a store identification that identifies the at least one retail location where the first item was purchased; and
   store the customer identification and the store identification in association with the first item identification in the price-paid database.

30. The system of claim 29, wherein the computer is further programmed to:
   format the price-paid database into one or more columnar entries, wherein the columnar entries include at least one of the customer identification, the store identification, the first item identification, the first price paid, the list price, and the price differential.

31. The system of claim 30, wherein the computer is further programmed to:
   generate a web page that displays the one or more prices paid from the price-paid database.

32. The system of claim 31, wherein the computer is further programmed to:
   receive, in association with the web page, a selection of a district, a store, a customer, a brand, or a sales category, wherein the one or more prices paid is provided based on the selection.

33. The system of claim 23, wherein the computer is further programmed to:
   recurrently request transfer of a new set of item identifications and a corresponding price paid for each of the new set of item identifications from one or more retailers.

34. The system of claim 33, wherein the computer is further programmed to:
   recurrently request transfer of an inventory list price or a price differential between the inventory list price and the corresponding price paid for each of the new set of item identifications.

35. The system of claim 34, wherein the computer is further programmed to:
   recurrently request transfer of a customer identification or a store identification.

36. The system of claim 35, wherein the computer is further programmed to:
   format the price-paid database into one or more columnar entries, wherein the columnar entries include the customer identification, the store identification, the purchase item identification, the price paid, the list price, or the price differential.

37. The system of claim 36, wherein the central computer is further programmed to generate a web page that displays the one or more prices from the price-paid database.

38. The system of claim 37, wherein the central computer is further programmed to:
   receive, in association with the web page, a selection of a district, a store, a customer, a brand, or a sales category, wherein the one or more prices paid is based on the selection.

39. The method of claim 1, the method further comprising:
   requesting a first item identification and a first price paid associated with the first item identification from a first retailer;
   requesting a second item identification and a second price paid associated with the second item identification from a second retailer; and
   storing the first item identification, the first price paid, the second item identification, and the second price paid in the price paid database.

40. The system of claim 23, wherein the central computer is further programmed to:
   request a first item identification and a first price paid associated with the first item identification from a first retailer;
   request a second item identification and a second price paid associated with the second item identification from a second retailer; and
   store the first item identification, the first price paid, the second item identification, and the second price paid in the price paid database.

* * * * *